United States Patent
Huang et al.

(10) Patent No.: US 7,855,702 B2
(45) Date of Patent: *Dec. 21, 2010

(54) SCALING-FRIENDLY ARCHITECTURE FOR LED (BACKLIGHT) DRIVERS TO MINIMIZE PCB TRACE LINES

(75) Inventors: Hsin Chiang Huang, Chupei (TW); Chang Kuang Chung, Chupei (TW)

(73) Assignee: Ascend Visual System, Inc., San Jose, CA (US)

( * ) Notice: Subject to any disclaimer, the term of this patent is extended or adjusted under 35 U.S.C. 154(b) by 900 days.

This patent is subject to a terminal disclaimer.

(21) Appl. No.: 11/744,752

(22) Filed: May 4, 2007

(65) Prior Publication Data

US 2008/0122764 A1 May 29, 2008

Related U.S. Application Data

(63) Continuation-in-part of application No. 11/563,089, filed on Nov. 24, 2006, now Pat. No. 7,737,926.

(51) Int. Cl.
G09G 3/32 (2006.01)
H01L 29/18 (2006.01)
H01L 29/20 (2006.01)
H05B 37/00 (2006.01)
H05B 39/00 (2006.01)

(52) U.S. Cl. .............................. 345/82; 345/83; 257/88; 257/89; 315/161

(58) Field of Classification Search ................... 345/82, 345/83; 257/88, 89; 315/161, 169.1
See application file for complete search history.

(56) References Cited

U.S. PATENT DOCUMENTS 5,200,763 A * 4/1993 Tanuma et al. ............... 347/237
7,294,970 B2 * 11/2007 Yang .......................... 315/158

* cited by examiner

*Primary Examiner*—Bipin Shalwala
*Assistant Examiner*—Ilana Spar
(74) *Attorney, Agent, or Firm*—Ming Chow; Sinorica, LLC

(57) ABSTRACT

This invention is a new LED back lighting architecture that each individual LED is controlled by its associated LED drive cell. The LEDs are sequentially connected one after another. A host controller transmits image displaying signals by signal scanning-flows. The current flow for controlling each LED's color lighting is by either binary current flow control or two-steps progressive current flow control.

14 Claims, 11 Drawing Sheets

SCALING-FRIENDLY ARCHITECTURE FOR LED (BACKLIGHT) DRIVERS TO MINIMIZE PCB TRACE LINES

The present invention is a continuation-in-part of U.S. application Ser. No. 11/563,089, filed on Nov. 24, 2006, now U.S. Pat. No. 7,737,926 and is herein incorporated in its entirety by reference for all purposes.

FIELD OF INVENTION

This invention relates to a novel backlighting architecture of and lighting control on the Light Emitting Diode (LED). The architecture is a break-through concept of controlling individual LED rather than the traditional controlling on a module with plurality LEDs. This architecture allows much more flexibilities in controlling individual LED's illumination and color saturation. Furthermore, by implementing the current inventive architecture, the current invention implements a signal scanning operation that allows a series control signals flow through each individual LED sequentially. The electric current flow for varying the lighting of each LED is controlled by a binary digital state in accordance with required image signal strength and required LED justifications. Therefore, this invention provides a detail lighting control on the electric current flow to a detail state which can be designated by any possible binary number. In addition, the electric current flow can also be controlled by a two-steps process in a progressive manner by using a Base Current Source (BCS) and adjusted by a Weight Current Source (WCS).

Furthermore, traditionally, an input data signal is provided as a serial signal transmitted sequentially through each connected Driver Integrated Circuit (Driver IC). Other control or data signals are transmitted in parallel connection to each Driver IC. The disadvantage of the parallel connection is the degradation of signal quality when the signal transmits farther along the transmission path. The industry has been implementing to increase the driving capability of the Host Controller in order to ensure the signal quality when the signal transmits to the destination. The approach not only increases the cost of the Host Controller but also easily reaches its limit when the LED applications requires larger size of PCB (Printed Circuit Board) boards and longer path for signal transmissions. This invention changes the parallel connections to be serial connections. The driving power for transmitting the signals is reduced to be enough for transmitting between the Driver ICs that are directly connected. The quality of the signals are therefore maintained when it reaches the destination no matter how long the transmission path is.

BACKGROUND OF THE INVENTION

The LED has been widely used in lighting display, either color or non-color, for various applications and industries. Although each individual LED is and can be a lighting source, however, all applications have been implementing "LED modules" for controlling purposes. The disadvantages of lighting control at the "LED module" level is that every single LED on the same "LED module" performs the same—in terms of luminance, color saturation, brightness, etc. Also, all applications have been controlling the electric current flow to each "LED module" by circuits that have been physically designed and defined for specified current flow amount. This invention resolves and overcomes the disadvantages as stated above by controlling the current flow to each individual LED. Also, the amount of electric current flow to each LED is controlled to a detail state that any binary number can represent. Alternatively, the electric current flow to each individual LED can also be controlled by a two-steps process in a progressive manner by implementing a BCS and adjusted by a WCS.

By the growth of LED applications among various industries, the size and quantity of LEDs increased significantly. The control and data signals that have been transmitted in parallel connections have been a concern for the degradation of its signal quality. In order to resolve the problem, instead of increasing the driving power and the costs of the Host Controller, this invention implements serial connections for transmitting those signals that have been transmitted in parallel connections. The signals are therefore guaranteed to meet with required signal quality.

SUMMARY OF THE INVENTION

This invention implements the lighting control on single LED instead of controlling on an LED module that has a plurality of single LEDs. The "single-LED lighting control" architecture improves the lighting varieties performed by a LED module down to a detail level of multiple LEDs.

Based on the "single-LED lighting control" architecture, the amount of electric current flow to each individual LED is controlled by a plurality of Replica Current Module (RCM). Each RCM is designated by a binary number (0 or 1) representing either ON or OFF. For a "quantity of n" RCMs, the combination of all RCMs can be represented by a n bits binary number $2^N$. Therefore, the electric current flow to each individual LED can be controlled to a detail of $2^n$ different flow amount. In order to determine the desired current flow amount for each individual LED, there are two determining factors—image data and justification data must be determined first. The image data is an image signal strength indicating the image frame to be displayed by the particular LED. The justification data is a justification factor when a LED is determined to perform either below or beyond expected performance standard. The manufacturing of LED, therefore, reduces its costs significantly that used to maintain each LED's performance as required. By applying justification data to the "single-LED lighting control" architecture allows each LED to perform as required regardless the performance outcome from the manufacturing.

Both the image data and the justification data (if any) are input to at least one logic operators for calculation in order to determine the binary state for controlling the electric current flow to each individual LED.

In addition, the electric current flow to each individual LED can be controlled in a two-step process by both a Base Current Source (BCS) and a Weight Current Source (WCS). The BCS is a predefined amount of electric current flow subject to each application design requirements to each individual LED. The BCS is further adjusted by a WCS in order to vary the predetermined BCS so that the amount of electric current flow to each LED can be various. The two-step electric current flow control can significantly reduce the required RCM and therefore consequently reduce the physical size and the cost.

When the Host Controller receives video signals for displaying by the LEDs, the Host Controller performs logic analysis and calculations and generates control signals to the designated LED Drive Cells. The control signals perform the backlight dimming control on the designated LEDs. The control signals and data signals are first transmitted to the first Driver IC that is directly connected to the Host Controller. Thereafter, the control signals and data signals are transmitted to the second Driver IC that is directly connected to the first Driver IC. Each Driver IC comprises a plurality of LED Drive Cell for each individual LED. Because all Driver ICs (including its LED drive Cells) are sequentially connected, the control signals and data signals are sequentially transmitted through each Driver IC (and each LED Drive Cell) along the transmission path until it reaches the designated Driver IC.

DETAIL DESCRIPTIONS OF THE INVENTION

Terminology and Lexicography:
Justification: A process to remedy the deficiency of a LED's lighting performance. The justification is NULL when the LED has no performance justification is required.
LED: A single or an individual LED has two terminals among which one terminal connects to the voltage source and the other terminal connects to the drive cell.
LED Module: A plurality of LEDs arranged in connections so that all LEDs are controlled by same controllers. Within the plurality of LEDs, there is only one individual LED connects to the voltage source and only one individual LED connects to the drive cell.
Signal scanning-flow: A signal or signals being transmitted through sequentially connected hardware elements.
Drive Cell: A controller controls one single LED. The major function of the Drive Cell is controlling the electric current and voltage to and from the controlled single LED.
Driver IC: An IC that flows programmed current through LED(s) and comprises at least one Drive Cell.

Figure 1:
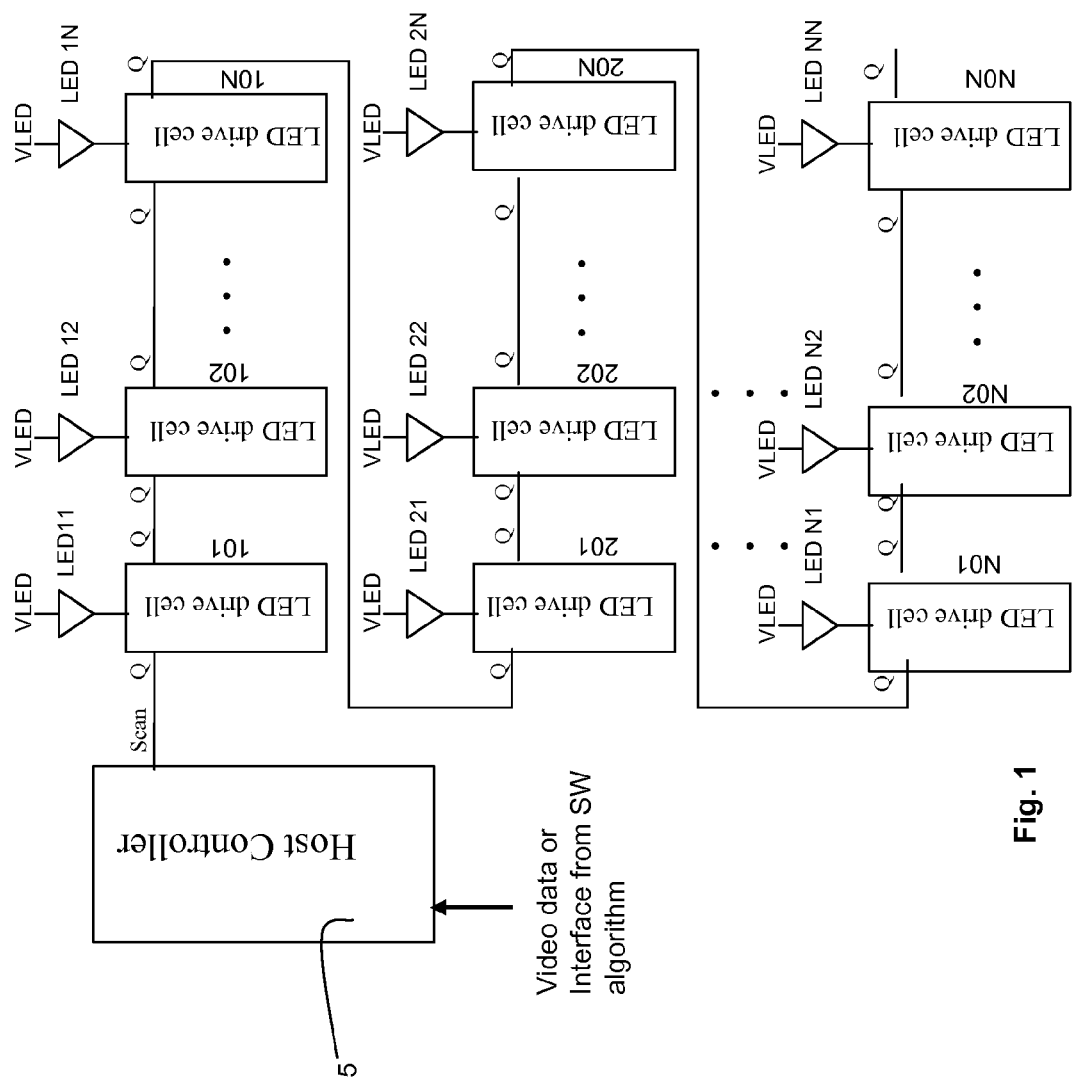
FIG. 1 is an embodiment of LED backlighting architecture.

Architecture
The FIG. 1 shows a LED lighting control architecture. The lighting control architecture includes a host controller 5, LED drive cells 101, 102, ..., 10N, 201, 202, ..., 20N, ..., N01, N02, ..., N0N, and LEDs 11, 12 ... 21, 22 ... M1, M2 ... MN. The host controller is a micro-processor or a digital processor for calculating and recording the image stream data. It provides the required color saturation or luminance information to the LED drive cells. The LED drive cells and the LEDs are arranged in a matrix structure. Each LED is driven by its designated LED drive cell while each LED drive cell is connected sequentially. The host controller transmits all image and control signals to the first LED drive cell that connects to the host controller directly. In response, the first LED transmits the same signal to the second LED drive cell that connects to the first LED drive cell. Sequentially, the signals are transmitted, in a manner of scanning-effect style, from the first drive cell via second, third, fourth, etc drive cells to the last LED drive cell N0N.

Figure 2:
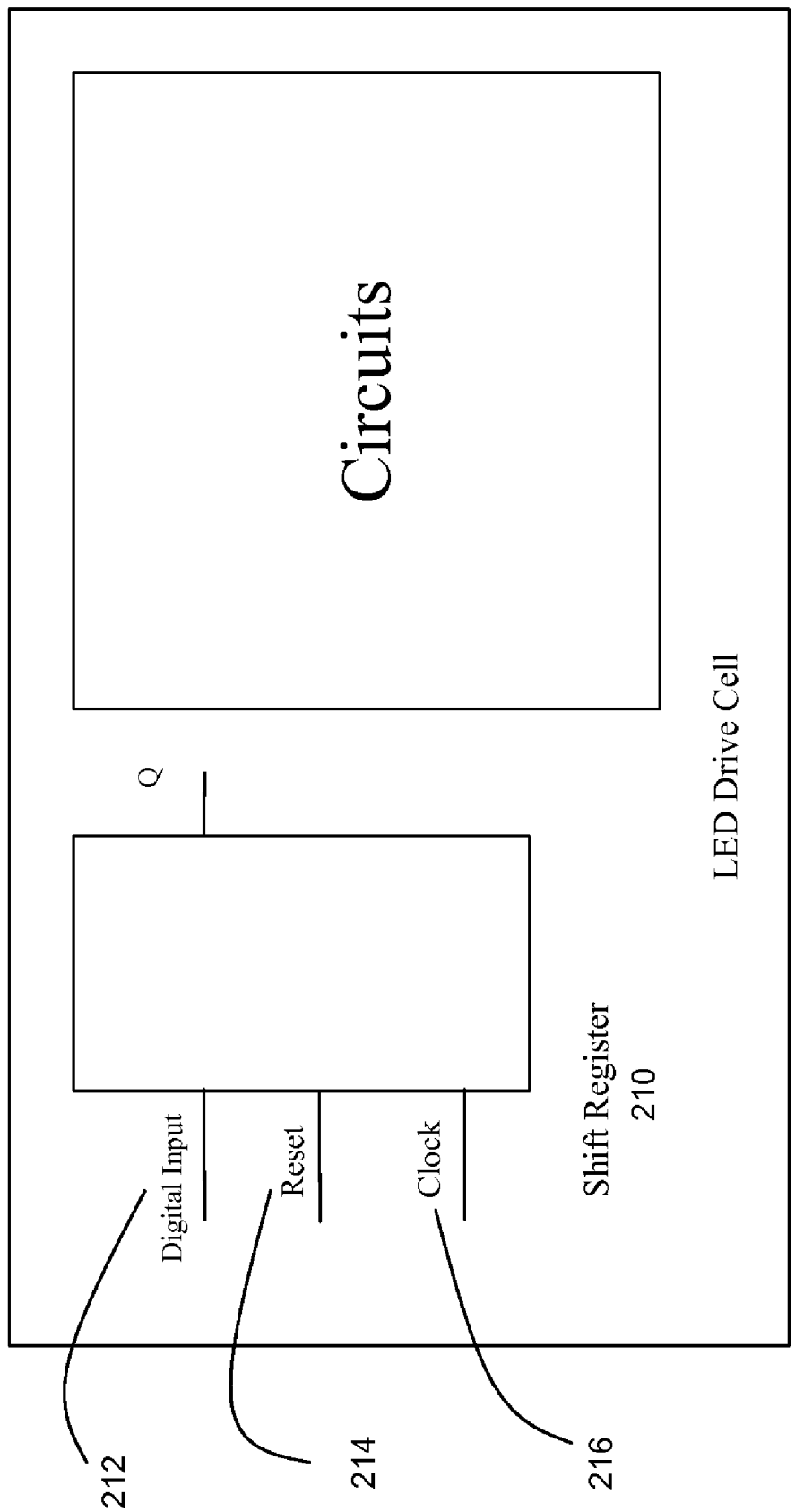
FIG. 2 is a LED drive cell.

The FIG. 2 shows a LED drive cell which includes a shift register 210. The shift register comprises a digital input pin 212, a reset module 214, and a clock module 216. When the lighting system is first initialized, all shift registers of all LED drive cells are reset by a rest signal. The host controller generates a signal to initiate the signal scanning-flow when the clock signal is toggling. The first LED drive cell is enabled when the signal scanning-flow reaches. The shift register of the first LED drive cell is enabled to memorize the state of the first LED and holds the state information until the same image frame information is transmitted to the last LED. Each LED's shift register memorizes the state of its designated LED and maintains the same lighting until the signal flow reaches the last LED. As soon as the current image frame is displayed from the first LED to the last LED, the signal for the next image frame begins and the shift registers reset when the next signal scanning-flow reaches. In other words, each LED's lighting remains the same until the next image frame signal reaches when it requires a lighting change.

Figure 3:
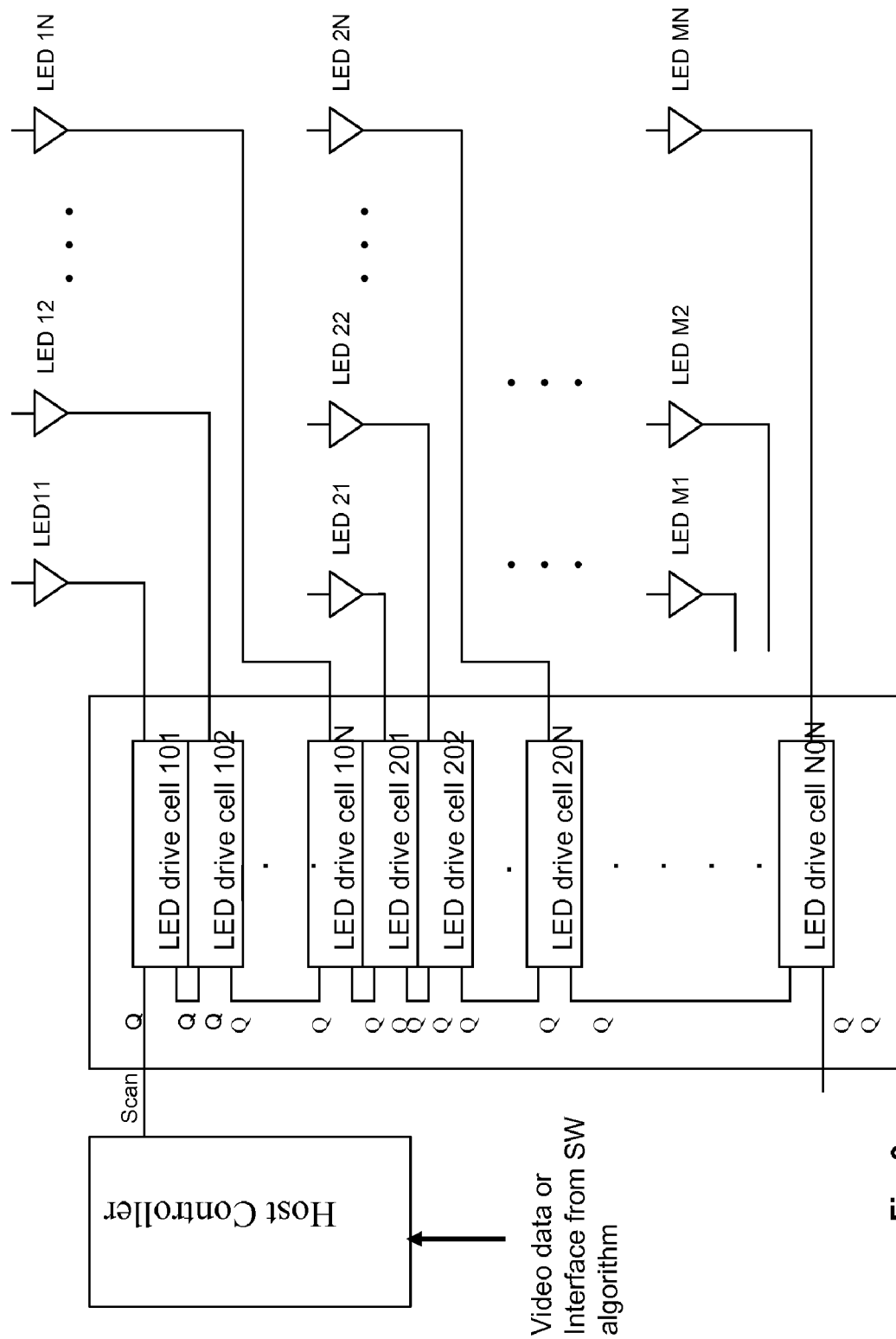
FIG. 3 is an embodiment of LED backlighting architecture with aggregated LED Drive Cells.

The FIG. 3 shows a different embodiment where the LED drive cells are physically aggregated and the signal scanning-flow remains the same as described by FIG. 2.

Figure 4:
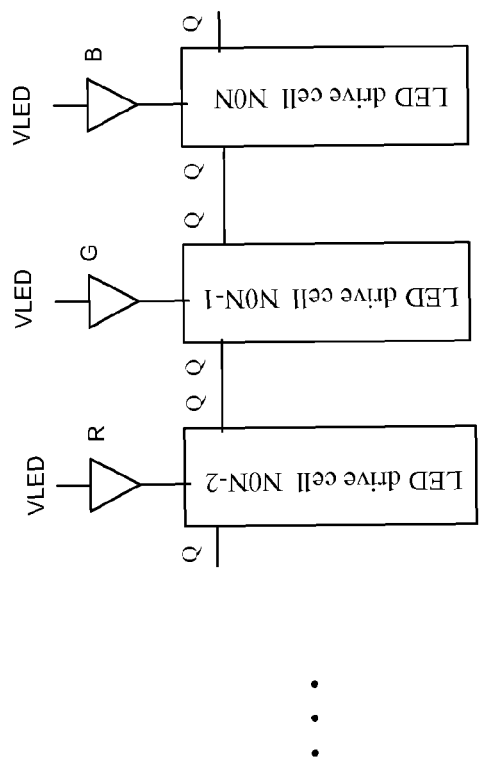
FIG. 4 is an embodiment of LED backlighting architecture with R-G-B alternating arrangement.
Figure 4:
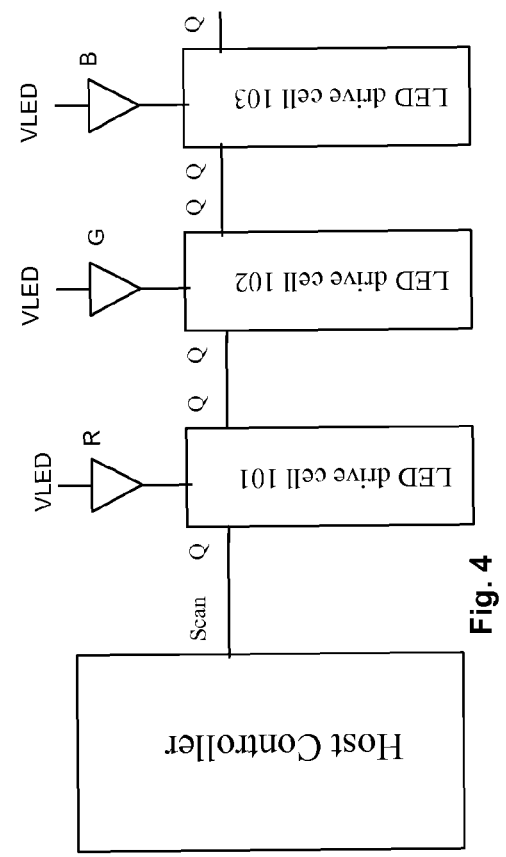
Figure 5:
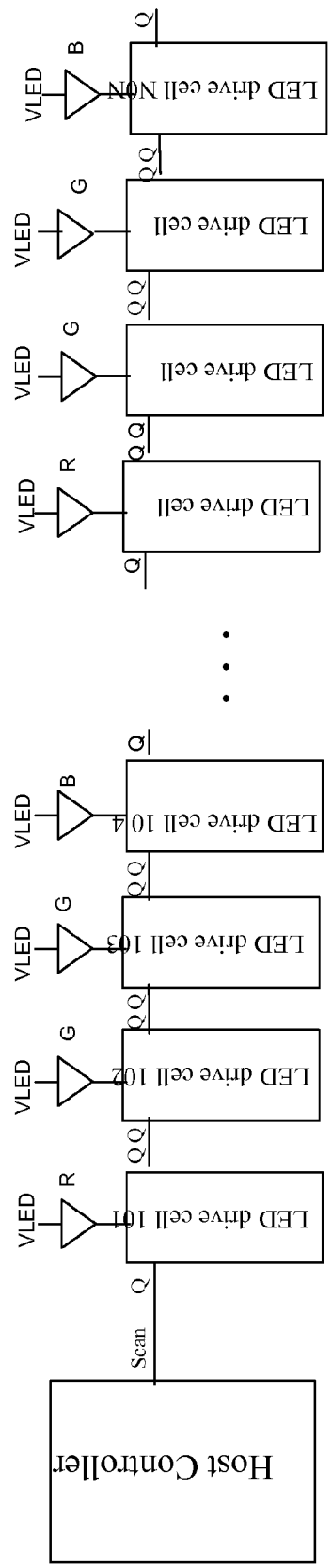
FIG. 5 is an embodiment of LED backlighting architecture with R-G-G-B alternating arrangement.
Figure 6:
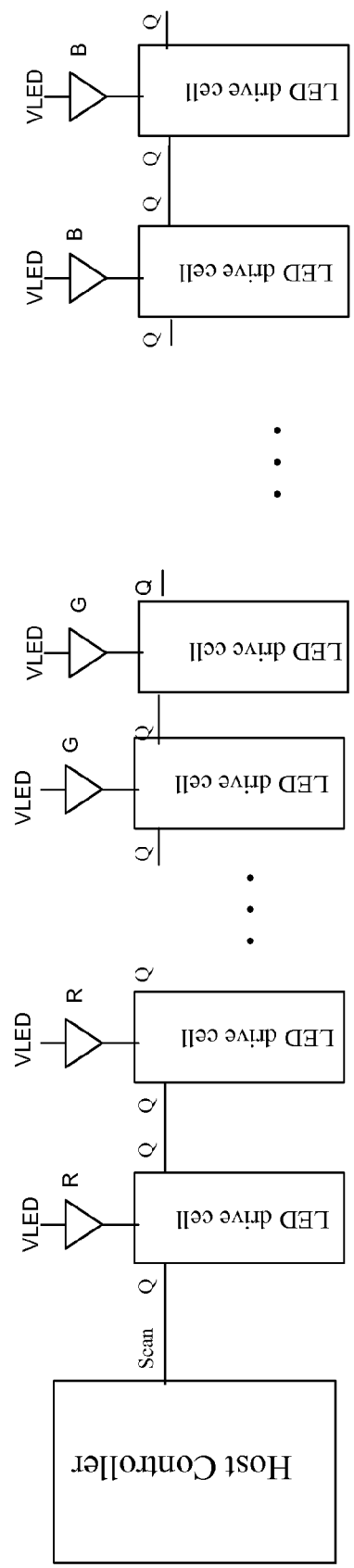
FIG. 6 is an embodiment of LED backlighting architecture with R-R-G-G-B-B alternating arrangement.

The FIG. 4 shows different embodiments that implement the same signal scanning-flow. However, these embodiments are designed for various color lighting variations. The FIG. 4 shows different color lighting LEDs that are arranged in Red-Green-Blue arrangement. The FIG. 5 shows different color lighting LEDs are arranged in Red-Green-Green-Blue arrangement. The FIG. 6 shows different color lighting LEDs are arranged in Red-Red— ... —Green-Green— ... —Blue-Blue— ... arrangement. These color lighting variations can only be arranged by the architecture of the current invention when the signal scanning-flow is implemented. The lighting arrangements are not limited as the figures illustrated. Other color lighting arrangements can also be arranged according to each application requirements.

Figure 7:
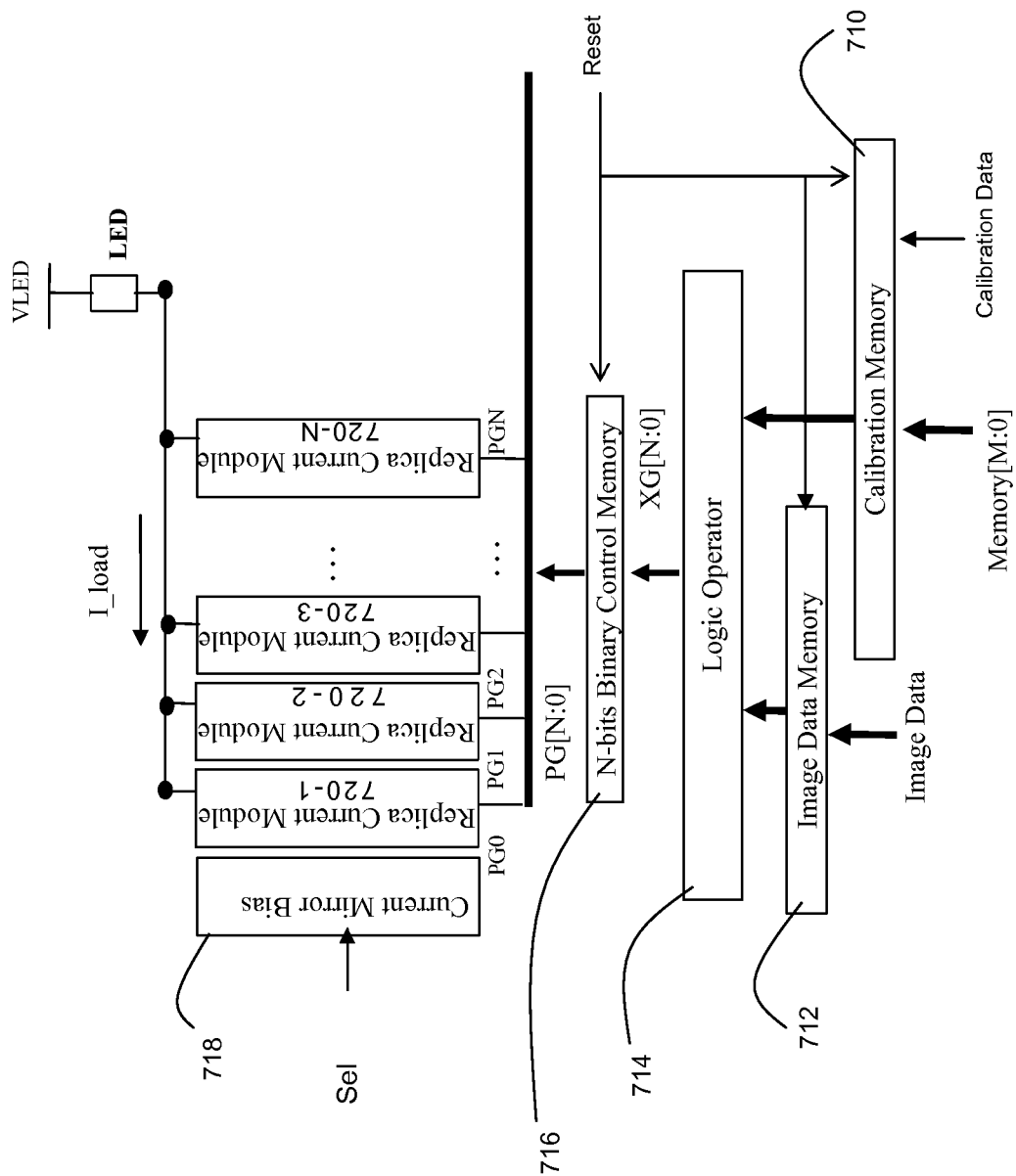
FIG. 7 is an LED Drive Cell architecture for binary electric current flow control.

Binary Electric Current Flow Control
The FIG. 7 shows the detail configurations of a LED and its LED drive cell. The LED drive cell comprises at least one Justification Memory 710 (the figure shows only one), at least one Image Data Memory 712 (the figure shows only one), at least one Logic Operator 714 (the figure shows only one), at least one Binary Flow Control Memory 716 (the figure shows only one), at least one Current Mirror Bias 718 (the figure shows only one), and a plurality of Replica Current Modules 720-1, 720-2, 720-3, ... 720-n.

The host controller transmits justification data signals to the at least one Justification Memory when the LED is required to have performance justification. The justification data signals are used to compensate the performance of degraded LED to achieve the desired lighting requirements. The host controller also transmits image data to the at least one Image Data Memory. The image data represents the to-be-displayed image lighting strength. In response to receiving the image data and the justification data signals, the at least one Logic Operator calculates, in accordance with a pre-defined logic, the image data and the justification data, to conclude a binary lighting state representation. This binary state representation, based on application requirements and the required Replica Current Modules, is a $2^{n+1}$ binary number where n is the number of Replica Current Modules. Each bit of the binary number (0 or 1) corresponds to a Replica Current Module indicating either ON (allowance) or OFF (disallowance) of the current flow to the corresponding Replica Current Module. When there are n (quantity) Replica Current Modules the possible current flow states are $2^{n+1}$ (two to the $[n+1]^{th}$ power of different states). In other words, the amount of current flow through the Replica Current Modules to the LED may vary for $2^{n+1}$ different amount current flows. The lighting variations of each specific LED, therefore, can achieve $2^{n+1}$.

Two-Step Electric Current Flow Control

Figure 8:
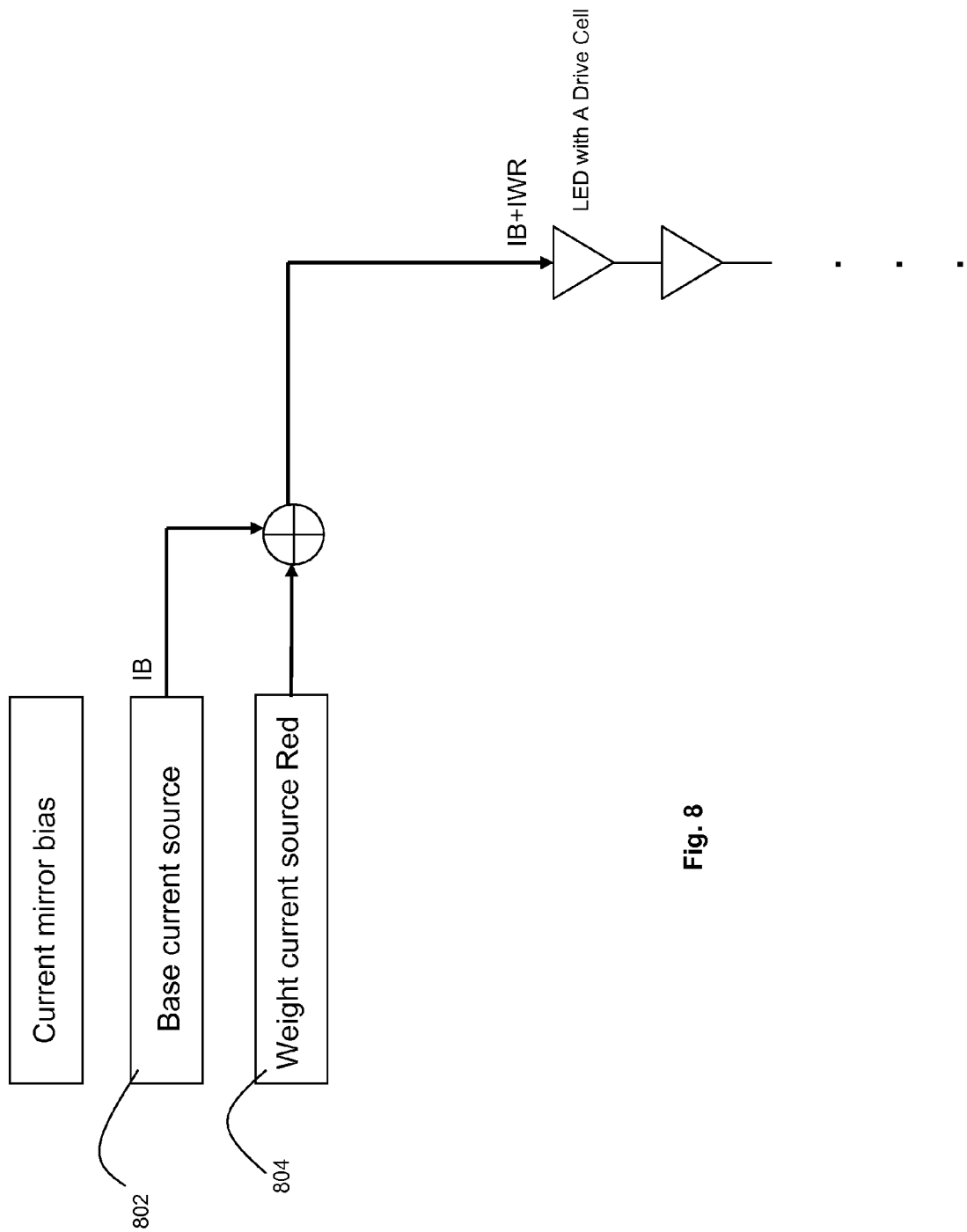
FIG. 8 is an arrangement for two-step electric current flow control.

The FIG. 8 shows electric current flow to each LED is controlled by a two-step progressive process. The LED Drive Cell is input with two current sources—a Base Current Source 802 and a Weight Current Source 804. The BCS is a predefined amount of current flow based on the application requirements. This BCS applies to every LED with the same amount of current flow. In order to justify various color lighting requirements, a WCS is input to adjust the amount of current flow from the BCS. The WCS changes through each image frame to be displayed. This electric current flow control reduces significantly the physical hardware spaces and costs for the RCMs that are required by the embodiment shown on FIG. 7.

Serial-Connections for Control Signals and Data Signals Transmissions

Figure 9:
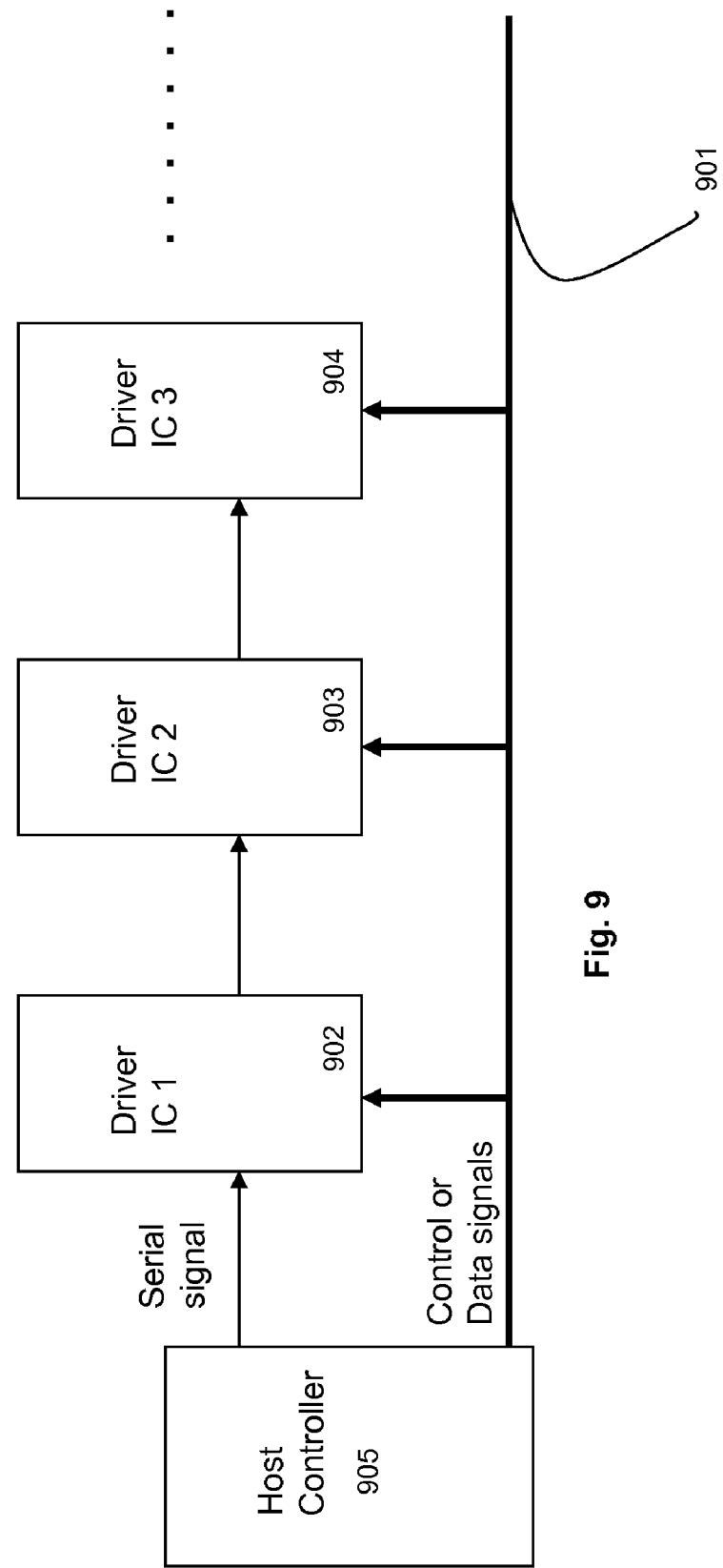
FIG. 9 is a configuration of a parallel connection for transmission of control signals and data signals.

The FIG. 9 shows a configuration of parallel connection 901 for transmitting control signals and data signals. This parallel connection has been implementing by industries for controlling LED lighting. The control and data signals are parallel transmitted to each Driver IC 902, 903, 904 when the Driver ICs are sequentially connected. When the size and quantity of LEDs required by an application increases, for example a larger backlighting demand, the quality of the control and data signals degraded through the transmission path. The degradation is caused by the loading of the registers and capacitors (RC; not shown on the Fig.) along the transmission path. The longer the transmission path is, the higher of the RC loading and consequently the more degradation of the signal quality. In order to resolve the problem of degradation of signal quality, conventionally the industries have been increasing the driving power of the Host Control 905 in order to maintain the signals quality when the signals reach its designated Driver IC. However, the increase of the driving power on the Host Control has its limit and do not meet the requirements of increasing size and quality of the demanded LEDs. Also, this conventional solution increases the costs of the Host Controller.

Figure 10:
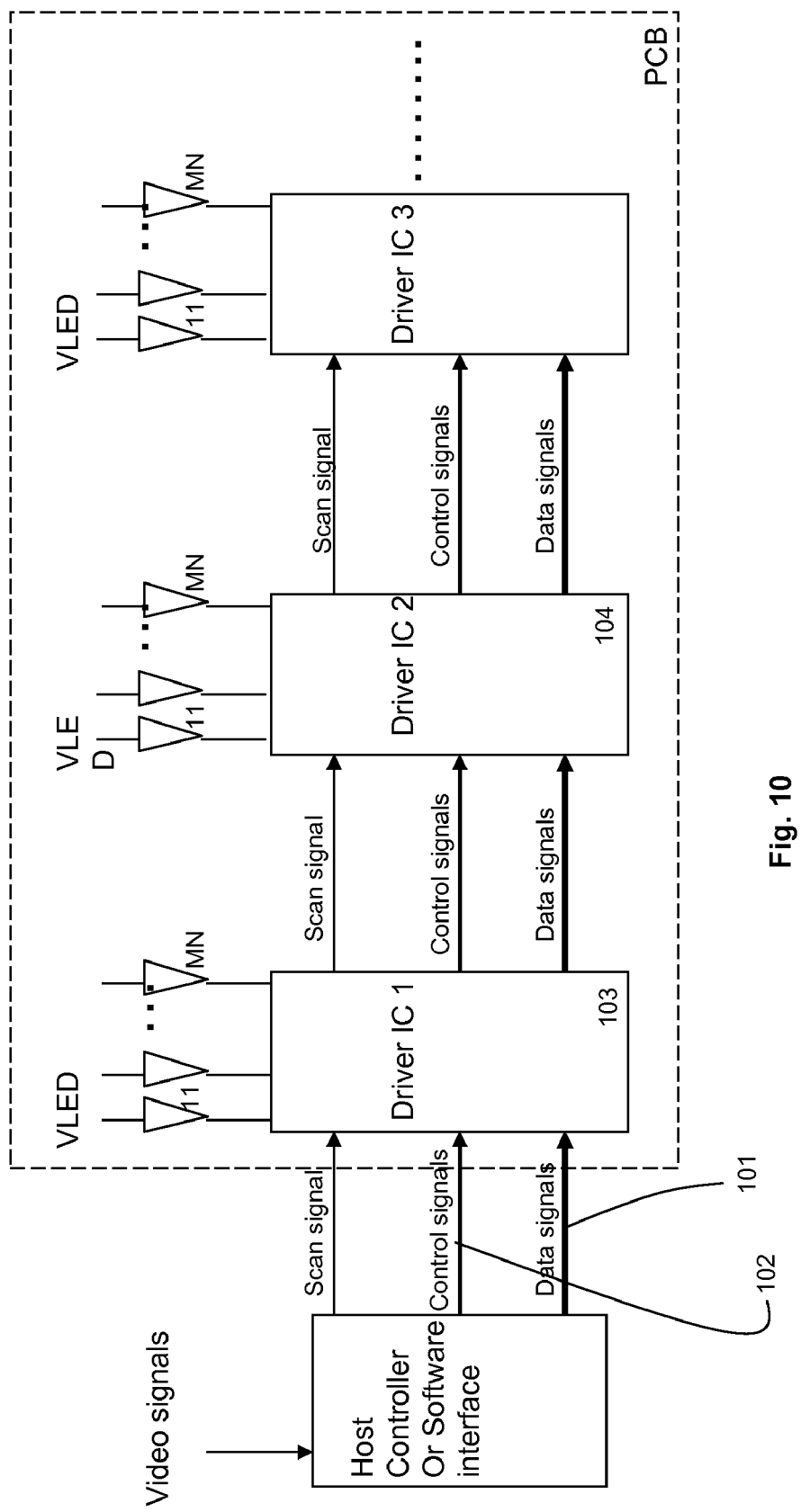
FIG. 10 is a configuration of serial connections for transmission of control signals and data signals within a PCB.

The FIG. 10 shows the serial connections 101, 102 for transmissions of control signals and data signals invented by the current invention. When the Host Controller 103 receives video or image signals, the Host Controller performs logic analysis and calculations and outputs control signals as well as data signals. The control and data signals are first transmitted to the first Driver IC 103 that is directly connected to the Host Controller. The LED Drive Cells (see FIG. 3) within the first Driver IC are also sequentially connected. The control and data signals are also sequentially transmitted from the first LED Drive Cell to the last LED Drive Cell within the first Driver IC. When the control and data signals reach the last LED Drive Cell within the first Driver IC, the control and data signals are then transmitted to the second Driver IC by the first Driver IC. The driving power required for the first Driver IC to transmit the control and data signals to the second driver IC is trivial because the short transmission path. By the same scenario, the control and data signals are transmitted sequentially from the first LED Drive Cell to the last LED Drive Cell within the second Driver IC. The control and data signals are transmitted sequentially from the first Driver IC to any Driver IC along the connecting path as design of each application requires. The signal qualities are maintained through the transmission regardless the length of transmission path. In other words, as each application's design requires, the size and quantity of LEDs can be increased without compromising the signal qualities and the cost of the Host Controller.

Figure 11:
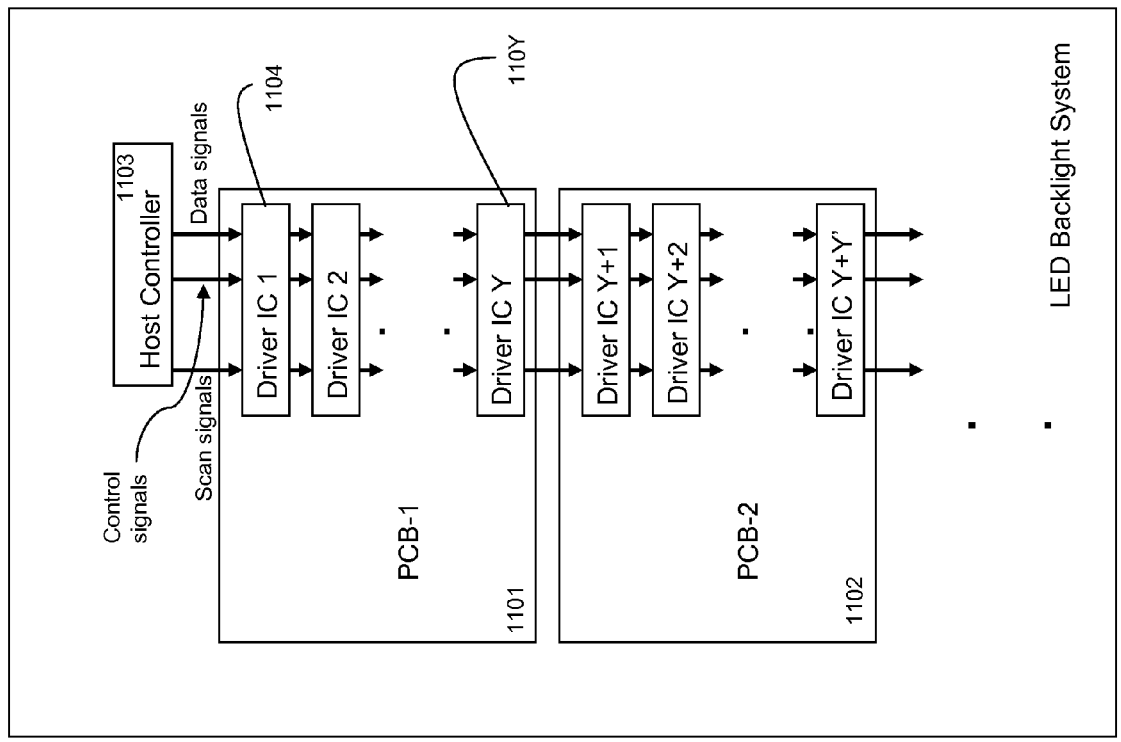
FIG. 11 is a configuration of serial connections for transmission of control signals and data signals among a plurality of PCBs

A Driver IC controls a matrix of LEDs where the matrix may comprise from an individual LED to a plurality of LEDs depending on the design of each LED application and the type of Driver IC. A PCB comprises a plurality of Driver ICs which controls a matrix of LED. By the growth of displaying size, for example, the television displaying size, a plurality of PCBs may be required to meet the backlighting requirements. The FIG. 11 shows the serial connections for a plurality of PCBs 1101, 1102. The control and data signals are first transmitted from the host Controller 1103 to the first PCB 1101 that is directly connected to the Host Controller. Within the first PCB, the control and data signals are sequentially transmitted from the first driver IC 1104 to the last driver IC 110Y. Within the first Driver IC, the control and data signals are sequentially transmitted from the first LED Drive Cell (not shown) to the last LED Drive Cell (not shown). When the control and data signals reach the last LED Drive Cell of the last Driver IC 110Y within the first PCB, the control and data signals are further transmitted to the second PCB 1102 that is directly connected to the first PCB. By the same scenario, the control and data signals are eventually and sequentially transmitted through the serial connections to the designated LED Drive Cell and its associated Driver IC and PCB. All control and data signals are transmitted and maintained with signal quality as each signal is powered to be transmitted for only a short path.

The invention claimed is:

1. A Light Emitting Diode (LED) lighting control system comprising:
   a plurality of LEDs wherein electronic current flow to each individual LED of said plurality of LEDs is controlled by separate LED drive cell;
   all system signals are transmitted via serial connections;
   said each LED drive cell is sequentially connected one after another wherein only one lead LED drive cell connects to the host controller;
   the host controller transmits displaying signals to the lead LED drive cell; and
   the displaying signals are transmitted to said each individual LED as signal scanning-flow;
   lighting color of said each individual LED is selected from the group consisting of red, green, and blue;
   said each LED drive cell comprises a shift register wherein the shift register stores lighting status of the LED controlled by said each LED drive cell;
   the lighting status is stored until a different displaying signal is received by the LED drive cell wherein the lighting status is stored;
   said each LED drive cell comprises at least one replica current module, and at least one justification memory, and at least one image data memory, and at least one logic operator, and at least one binary control memory;
   said host controller transmits LED justification data to the at least one justification memory; and
   said host controller transmits displaying data to the at least one image data memory.

2. The LED lighting control system of claim 1, wherein
the at least one logic operator executes calculations on the justification data and the displaying data in accordance with a predefined logic expression; and
in response to the calculations the logic operator generates a N bits binary number, wherein the N is a predefined quantity of the at least one replica current module.

3. The LED lighting control system of claim 2, wherein
a binary number of each of the N bits indicates allowance or disallowance of electric current flow to said each individual LED.

4. The LED lighting control system of claim 1, wherein
a predefined amount of electric current flow is input to said each LED drive; and
in response of the input, an adjusting electric current flow is input to said each LED drive to alter the predefined amount of electric current flow.

5. A Light Emitting Diode (LED) lighting control system comprising:
a plurality of LEDs;
a plurality of LED drive cells wherein each LED drive cell of the plurality of LED drive cells connects to different LED;
said each LED drive cell is sequentially connected one after another wherein only one lead LED drive cell connects to the host controller;
all system signals are transmitted via serial connections;
electronic current flow to each individual LED of said plurality of LEDs is controlled by separate LED drive cell;
the host controller transmits displaying signals to the lead LED drive cell;
the displaying signals are transmitted to said each individual LED as signal scanning-flow;
said each LED drive cell comprises at least one replica current module, and at least one justification memory, and at least one image data memory, and at least one logic operator, and at least one binary control memory;
said host controller transmits LED justification data to the at least one justification memory; and
said host controller transmits displaying data to the at least one image data memory.

6. The LED lighting control system of claim 5, wherein
lighting color of said each individual LED is selected from the group consisting of red, green, and blue; and
said each LED drive cell comprises a shift register wherein the shift register stores lighting status of the LED controlled by said each LED drive cell; and
the lighting status is stored until a different displaying signal is received by the LED drive cell wherein the lighting status is stored.

7. The LED lighting control system of claim 6, wherein
the at least one logic operator executes calculations on the justification data and the displaying data in accordance with a predefined logic expression; and
in response to the calculations the logic operator generates a N bits binary number, wherein the N is a predefined quantity of the at least one replica current module.

8. The LED lighting control system of claim 7, wherein
a binary number of each of the N bits indicates allowance or disallowance of electric current flow to said each individual LED.

9. The LED lighting control system of claim 6, wherein
a predefined amount of electric current flow is input to said each LED drive; and
in response of the input, an adjusting electric current flow is input to said each LED drive to alter the predefined amount of electric current flow.

10. A Light Emitting Diode (LED) lighting control system comprising:
a plurality of LEDs wherein electronic current flow to each individual LED of said plurality of LEDs is controlled by separate LED drive cell;
all system signals are transmitted via serial connections;
said each LED drive cell comprises at least one replica current module, and at least one justification memory, and at least one image data memory, and at least one logic operator, and at least one binary control memory;
said host controller transmits LED justification data to the at least one justification memory; and
said host controller transmits displaying data to the at least one image data memory.

11. The LED lighting control system of claim 10, wherein
the at least one logic operator executes calculations on the justification data and the displaying data in accordance with a predefined logic expression; and
in response to the calculations the logic operator generates a N bits binary number, wherein the N is a predefined quantity of the at least one replica current module.

12. The LED lighting control system of claim 11, wherein
a binary number of each of the N bits indicates allowance or disallowance of electric current flow to said each individual LED.

13. The LED lighting control system of claim 10, wherein
a predefined amount of electric current flow is input to said each LED drive; and
in response of the input, an adjusting electric current flow is input to said each LED drive to alter the predefined amount of electric current flow.

14. The LED lighting control system of claim 10, wherein
said each LED drive cell is sequentially connected one after another wherein only one lead LED drive cell connects to the host controller; and
the host controller transmits displaying signals to the lead LED drive cell; and
the displaying signals are transmitted to said each individual LED as signal scanning-flow; and
lighting color of said each individual LED is selected from the group consisting of red, green, and blue; and
said each LED drive cell comprises a shift register wherein the shift register stores lighting status of the LED controlled by said each LED drive cell; and
the lighting status is stored until a different displaying signal is received by the LED drive cell wherein the lighting status is stored.

* * * * *